Sept. 15, 1942.         C. M. HINES         2,295,733
BRAKE CONTROL MEANS
Filed April 30, 1941
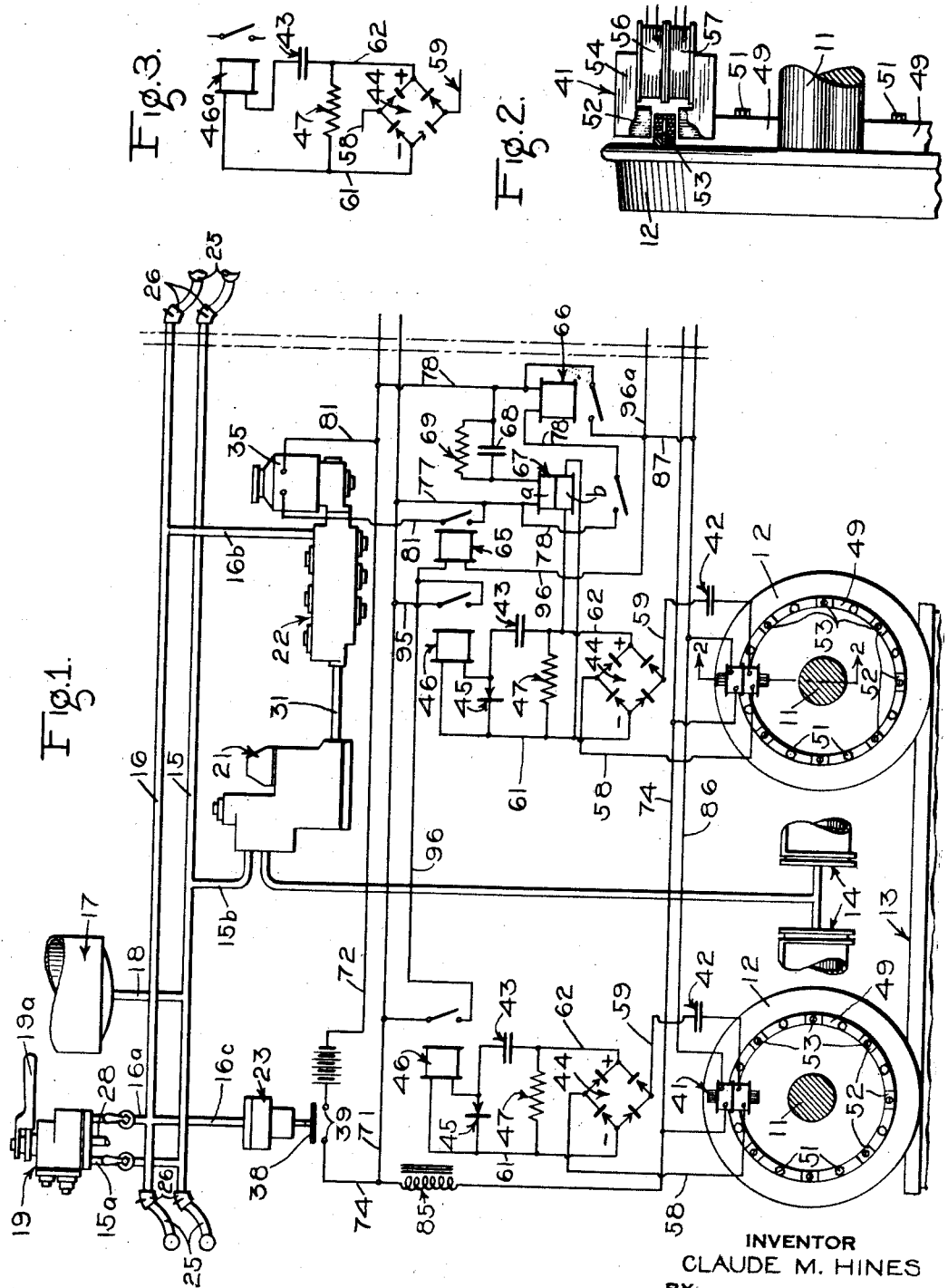
INVENTOR
CLAUDE M. HINES
BY
*A. M. Higgins*
ATTORNEY Patented Sept. 15, 1942

2,295,733

UNITED STATES PATENT OFFICE 2,295,733

BRAKE CONTROL MEANS

Claude M. Hines, Pittsburgh, Pa., assignor to The Westinghouse Air Brake Company, Wilmerding, Pa., a corporation of Pennsylvania Application April 30, 1941, Serial No. 391,049

15 Claims. (Cl. 303—21)

This invention relates to brake control means for vehicles, such as railway cars and trains, and has particular relation to vehicle brake control apparatus including means of the induction generator type for detecting the slipping of vehicle wheels and adapted to cause a release of the brakes automatically upon the slipping of a vehicle wheel to prevent the sliding thereof.

In the present application, the terms "slip" and "slide" as applied to a vehicle wheel are not synonymous but have different meanings. The term "slip" or "slipping condition" refers to the rotation of a vehicle wheel at a speed less than that corresponding to vehicle speed at a given instant, whereas the term "slide" or "sliding condition" refers to the locked or non-rotative condition of the wheel in which it is dragged along the rail without rotation.

In the copending application Serial No. 381,083 of Joseph C. McCune, filed February 28, 1941, and assigned to the same assignee as the present application, there is disclosed a vehicle brake control apparatus including a wheel-slip detector of the induction generator type. The generator includes a primary and secondary winding associated with a magnetic core element having an air gap therein through which a plurality of magnetic elements, secured in peripherally spaced relation on a vehicle wheel, pass in succession to effect an alternate increase and decrease of the magnetic flux density in the magnetic core element when the primary winding is energized from a direct current source. The alternating-current voltage induced in the secondary winding is rectified and is effective to control a relay to cause pick-up thereof only when the voltage delivered by the secondary winding changes at a rate exceeding a certain rate and corresponding to the rotative deceleration of the corresponding wheel at a slipping rate.

The arrangement of the circuit controlling the energization of the primary winding in the induction generator in the above-mentioned copending application is such that current is supplied to energize the primary winding as long as the brakes are applied whether the vehicle is in motion or is stopped. Thus if the vehicle is stopped for any length of time, there is an undesirable drainage of the current from the source. Where the source of current is a storage battery, this drainage of current is undesirable. It is accordingly an object of my invention to provide an arrangement for interrupting the supply of current to the primary winding of the induction generator, in a vehicle brake control apparatus of the type shown in the copending application Serial No. 381,083, whenever the vehicle comes to a stop, notwithstanding the fact that the brakes remain applied.

It is a further object of my invention to provide an arrangement whereby the undesired release of the wheel brakes which might result from interruption of the supply of current to the primary winding of the induction generator is positively prevented.

The above objects, and other objects of my invention which will be made apparent hereinafter, are attained by means of apparatus subsequently to be described and shown in the accompanying drawing, wherein Fig. 1 is a diagrammatic view, showing a simplified form of vehicle brake control apparatus having an induction generator type of wheel-slip detector and embodying my invention, Fig. 2 is a fragmental enlarged view, showing in further detail the arrangement of an induction generator type of wheel-slip detector in connection with a vehicle wheel, Fig. 3 is a fragmental diagrammatic view showing a modification of the wheel-slip detecting apparatus of Fig. 1.

Description of equipment

Referring to the drawing, a simplified fluid pressure brake control apparatus is shown applied to a single four-wheel railway car truck. Additional wheel trucks are omitted from the drawing for simplicity inasmuch as they constitute mere duplication of the wheel truck shown, as well as duplication of the major part of the control equipment shown in connection with the wheel truck in the drawing.

Each wheel truck comprises two wheel units or wheel-and-axle assemblies having an axle 11 and two wheels 12, only one of which is shown in the drawing, fixed at opposite ends thereof and rolling on opposite rails of the track 13. The details of the wheel truck are omitted inasmuch as any suitable type of truck frame may be provided.

The brakes associated with the wheels 12 may be of the conventional clasp shoe type or of the less conventional rotary or disk type shown in the above-mentioned copending application Serial No. 381,083 of Joseph C. McCune. In any case, the brakes are applied in response to the supply of fluid under pressure to one or more brake cylinders 14, two of which are shown for purposes of illustration, and released in response to the release of fluid under pressure from the brake cylinders. In the rotary or disk type of brakes, the brake cylinders may be annular in form and disposed in concentric relation to the wheel axle 11.

It will be understood, therefore, that the particular type of fluid pressure controlled brake is immaterial for the purposes of the present invention.

Any suitable or well-known type of brake control apparatus, either of the so-called automatic or straight-air type, may be provided for supplying fluid under pressure to the brake cylinders and releasing fluid under pressure therefrom for controlling the application and release of the wheel brakes. For purposes of illustration, I have shown a simplified straight-air type of fluid pressure brake control apparatus. This apparatus includes two train pipes 15 and 16, hereinafter respectively referred to as the supply pipe and control pipe; a reservoir 17, hereinafter referred to as the main reservoir, to which the supply pipe 15 is constantly connected through a branch pipe 18; a manually operative brake valve 19 of well-known self-lapping type for controlling the pressure in the control pipe 16; a high-capacity supersensitive relay valve device 21 for controlling the supply of fluid under pressure to and the release of fluid under pressure from the brake cylinders; an electropneumatic control valve mechanism 22, hereinafter referred to simply as the control valve mechanism, for controlling the supply of fluid under pressure from the control pipe to the control chamber of the relay valve 21 and the release therefrom; and a pressure operated switch device 23, hereinafter referred to as the pressure switch, operatively responsive to variations of pressure in the control pipe 16.

The train pipes 15 and 16 are made up, in the usual manner, of sections on each car of the train, the sections of adjacent cars being connected through conventional hose couplings 25. Suitable angle cocks 26 at opposite ends of each section of the pipes 15 and 16 on each car may be also provided in the usual manner for opening and closing communication as desired.

The brake valve 19 is, as previously stated, of a well-known type and accordingly a functional description thereof is deemed sufficient for purposes of the present invention. Brake valve 19 has an operating handle 19a which is adapted to be shifted in a horizontal plane to rotarily move a rotary operating shaft that operates suitable supply and release valves. With the brake valve handle 19a in its normal or brake release position, fluid under pressure is completely released from control pipe 16 to atmosphere through an exhaust port and pipe 28 at the brake valve. When the brake valve handle 19a is shifted horizontally out of its brake release position into a so-called application zone, fluid under pressure is supplied from the supply pipe 15 to the control pipe 16, the pipes 15 and 16 being respectively connected to the brake valve by branch pipes 15a and 16a. The pressure of the fluid established in the control pipe 16 is substantially proportional to the degree of displacement of the brake valve handle 19a out of its brake release position.

If the pressure in the control pipe 16 tends to reduce for any reason, such as leakage, the brake valve 19 operates automatically to continue to supply fluid under pressure to the control pipe to maintain a pressure therein corresponding to the position of the brake valve handle. This pressure-maintaining feature of the brake valve 19 will be referred to hereinafter in connection with an assumed operation of the equipment.

The relay valve device 21 is of the self-lapping type described and claimed in Patent 2,096,491 to Ellis E. Hewitt and is accordingly shown only in outline form herein because reference may be had to this patent for a description thereof. Briefly, however, the relay valve device 21 comprises suitable supply and release valves adapted to be operated by an operating piston or a diaphragm at one side of which is a control chamber to which fluid under pressure is supplied through a pipe 31 and subject on the opposite side to the pressure in a pressure chamber which is connected to the brake cylinders 14 by a pipe 32.

When fluid under pressure is supplied through pipe 31 to the control chamber of the relay valve device 21, the relay valve device operates to supply fluid under pressure from a branch pipe 15b of the supply pipe to the brake cylinder pipe 32 and thus to the brake cylinders 14. When the pressure in the brake cylinders builds-up sufficiently to counteract the force of the pressure of the fluid supplied to the control chamber, the valve mechanism of the relay valve device is operated to lap position to cut-off the further supply of fluid under pressure to the brake cylinders.

Upon the supply of fluid at a higher pressure to the control chamber of the relay valve device 21, the relay valve device again operates to supply fluid to the brake cylinders to build-up a higher pressure therein in correspondence with the higher pressure supplied to the control chamber.

When the pressure of the fluid supplied to the control chamber of the relay valve device 21 is reduced, the relay valve device operates to release fluid under pressure from the brake cylinders through an exhaust port (not shown) of the relay valve device until such time as the pressure in the brake cylinders again corresponds to the control chamber pressure, at which time the further release of fluid under pressure from the brake cylinders is cut-off.

The relay valve device 21 may be designed to establish any desired ratio between the fluid pressure established in the brake cylinders and the pressure of the fluid supplied through pipe 31 to the control chamber of the relay valve device. For purpose of illustration, it is here assumed that the fluid pressure established in the brake cylinders is equal to the pressure of fluid established to the control chamber of the relay valve device.

The control valve mechanism 22 is of the type shown and described in the above-mentioned copending application Serial No. 381,083 of Joseph C. McCune and is, therefore, shown only in outline form herein since reference may be had to the patent for a description of the structure thereof and its operation.

Briefly, however, the control valve mechanism 22 comprises pneumatically operated supply and release valves, electrically controlled by means of a magnet valve having an electromagnetic winding or solenoid 35. Normally, when the electromagnet winding 35 is deenergized, the supply valve is in open position establishing communication between a branch pipe 16b of the control pipe and pipe 31 leading to the control chamber of the relay valve device 21, while the release valve is closed.

Upon energization of the electromagnet winding 35, the supply and release valves are substantially simultaneously operated to closed and open positions, respectively, the supply valve cutting off the connection between the branch pipe 16b and the pipe 31 and the release valve opening an exhaust communication through which fluid under pressure is exhausted at a rapid rate from the control chamber of the relay valve device 21.

The control valve mechanism 22 also includes a reapplication control device which is effective to restrict to a relatively slow rate the supply of fluid under pressure to the pipe 31 and control chamber of the relay valve device 21 as long as a certain differential pressure such as five pounds per square inch exists between the pressure in the control pipe 16 and that in the control chamber of the relay valve device 21. The purpose of the reapplication control device is to cause reapplication of the brakes following a slipping of the wheels at a slow rate to minimize the possibility of recurrence of wheel-slipping.

The pressure switch 23 may be of any suitable type, such as that shown in Patent 2,096,492 to Ellis E. Hewitt. As diagrammatically shown, the pressure switch 23 comprises a pressure-responsive member (not visible) subject on one side to the pressure of fluid in a pressure chamber connected to the control pipe 16 by a branch pipe 16c, and a movable contact 38 operated from a position out of engagement with a pair of fixed stationary contacts 39 into engagement therewith in response to an increase of the pressure acting in the pressure chamber above a certain low value, such as five pounds per square inch. Conversely, when the pressure in the control pipe 16 reduces below five pounds per square inch, the contact 38 is restored to its normal position out of engagement with the associated contacts 39. The character of the pressure switch 23 is such that the movement of the contact 38 either into or out of engagement with the contact 39 is snap-acting, thus minimizing burning of the contacts due to arcing. The purpose of the pressure switch 23 will be made apparent hereinafter.

In accordance with the principles set forth in the copending application Serial No. 381,083 of Joseph C. McCune, there is provided in associative relation with each of the wheel-and-axle assemblies a wheel-slip detecting apparatus including an induction generator 41, two electrical condensers 42 and 43, respectively, a full-wave rectifier 44 diagrammatically shown as of the dry disk or copper-oxide type, a half-wave rectifier or asymmetric device 45 of any suitable type, a relay 46 of the neutral type, and a resistor 47.

As shown in Figs. 1 and 2, the induction generator 41 comprises a ring 49 of non-magnetic material, such as aluminum, secured as by a plurality of screws or bolts 51 to the inner face of a car wheel in concentric relation to the axle 11 to which the wheel is fixed. The ring 49 is provided with a plurality of substantially equally spaced notches or recesses for receiving laminated inserts 52 of magnetic material. Each insert is suitably secured to the ring 49 as by a screw 53.

The induction generator 41 further comprises a magnetic core member 54, preferably laminated, of C-shape having an opening or air gap therein whereby the pole pieces so formed are positioned on opposite sides of the ring 49 (see Fig. 2) when the magnetic core member is mounted in its proper position. The magnetic core member 54 may be mounted in any suitable manner from an unsprung part of the car truck so as to move in correspondence with the movement of the wheel, due to shock or jar incident to travel along the track. The specific mounting means for the magnetic core member 54 is omitted for simplicity although a specific manner of mounting the magnetic core member is shown and described in the above-referred to McCune application Serial No. 381,083.

Carried on the magnetic core member 54 are two electromagnetic windings 56 and 57, hereinafter referred to respectively as the primary winding and the secondary winding.

When the primary winding 56 is energized by direct-current in the manner presently to be described, the rotation of the car wheel 11 and the consequent passage of the magnetic inserts 52 in succession between the pole-pieces of the magnetic core member 54 causes an alternate increase and decrease in the flux density in the magnetic core member. An alternating-current voltage is accordingly induced in the secondary winding 57 having a frequency proportional to the rotational speed of the car wheel 12.

The two terminals of the secondary winding 57 are connected by wires 58 and 59 to the input terminals of the full-wave rectifier 44, the condenser 42 being interposed in one of the wires, such as the wire 59, for the purpose of improving the power-factor in the circuit of the secondary winding 57.

The resistor 47 is connected by wires 61 and 62 across the output terminals (marked "+" and "—") of the rectifier 44. It will thus be seen that the voltage impressed on the resistor 47 is a direct-current voltage corresponding substantially to the effective value of the alternating-current voltage induced in the secondary winding 57 of the induction generator.

The condenser 43 and the winding of the relay 46 are connected in series relation across the opposite terminals of the resistor 47. The half-wave rectifier 45 is connected in parallel relation to the winding of the relay 46.

Upon acceleration of the car wheel 12, the voltage impressed on the resistor 47 increases at a corresponding rate and a charging current is accordingly set up to charge the condenser 43, which charging current is proportional to the rate of change of voltage across the resistor 47.

The half-wave rectifier 45 is so connected in parallel relation to the winding of the relay 46 as to permit the condenser-charging current to by-pass or shunt the winding of the relay 46. Thus the contact of the relay 46 is not picked-up in response to acceleration of the car wheel 12.

Conversely, when the car wheel 12 decelerates, the voltage across the resistor 47 reduces at a rate corresponding to the rate of deceleration of the wheel. Upon the reduction of the voltage across the resistor 47, current is discharged from the condenser 43, which discharge current is in the opposite direction to that of the charging current occurring when the wheel accelerates. In this instance, therefore, the half-wave rectifier 45 is effective to prevent the flow of current therethrough and thus the condenser-discharge current flows through the winding of the relay 46.

The winding of the relay 46 is so designed that when the current discharged through the winding thereof from the condenser 43 exceeds a certain value corresponding to a certain rate of deceleration of the car wheel, the contact of the relay is actuated to its picked-up or closed position.

In view of the well-known fact that a car wheel can not attain a rate of rotative deceleration corresponding to retardation of the car at a rate exceeding ten miles per hour per second unless it is slipping, it will be seen that if the winding of the relay 46 is so designed that it is not picked-up unless the car wheel decelerates rotatively at a rate corresponding to a retardation of the vehicle or car at ten or more miles per hour per second, the relay 46 will not be picked-up unless the car wheel decelerates at a slipping rate.

It is a well-known fact that due to the reduction in the air gap between the armature and the core of a relay when the relay is picked-up, it requires a lesser current to maintain the relay picked-up than to cause it to be initially picked-up. Thus, although the relay 46 may pick-up only in response to the slipping of the car wheel, it may remain picked-up until the wheel ceases to decelerate at a certain lower rate, such as a rate corresponding to six miles per hour per second retardation of the car. At such time, the current being discharged from the condenser will have reduced sufficiently to permit the contact of the relay to be restored to its dropped-out or open position.

The half-wave rectifier 45 may be omitted if a unidirectional relay 46a is substituted for the relay 46, in the manner shown in Fig. 3. The term "unidirectional relay" refers to a relay which is inherently designed to pick-up only in response to flow of current through the winding thereof in one direction, flow of current through the winding thereof in the opposite direction being ineffective to cause pick-up thereof.

In addition to the above-described apparatus, I provide according to my invention, apparatus for controlling the primary winding 56 of the induction generator 41 on a car in a manner to automatically interrupt the circuit therefor whenever the car stops.

This additional apparatus comprises two single coil relays 65 and 66 of the neutral type, a double-coil relay 67 of the neutral type, an electrical condenser 68 and a resistor 69.

The relays 65 and 66 are conventional relays each having a single front contact normally biased to a dropped-out or open position and adapted to be actuated to a picked-up or closed position in response to energization of the winding of the relay.

The relay 67 is provided with two separate windings $a$ and $b$ respectively, and a single front contact which is normally biased to dropped-out or open position. Energization of winding $a$ by a current exceeding a certain value causes actuation of the contact to its picked-up or closed position. Energization of winding $b$ by a current exceeding a certain value is effective to maintain the contact in its picked-up position.

The electrical condenser 68 and the resistor 69 are connected in parallel relation to each other in a series circuit, including the winding $a$ of the relay 67, across two wires, hereinafter referred to as the positive battery wire 71 and the negative battery wire 72.

The negative battery wire 72 is connected to the negative terminal of a suitable source of direct-current, such as a storage battery 73. The positive battery wire 71 is connected to a wire 74 that is, in turn, connected to the positive terminal of the battery 73 only when the contact 38 of the pressure switch 23 engages the associated contacts 39, that is, when pressure switch 23 is closed. In other words, the voltage of the battery 73 is not impressed across the positive and negative battery wires unless the pressure in the control pipe 16 exceeds a certain value, assumed to be five pounds per square inch, sufficient to actuate the contact 33 of the pressure switch 23 to its closed position.

The winding $b$ of the relay 67 is connected across the output terminals of the full-wave rectifier 44 included in the wheel-slip detecting apparatus associated with one of the wheel-and-axle assemblies on a car, such as the right-hand wheel-and-axle assembly shown in Fig. 1.

The resistance of the resistor 69 is such that when the pressure switch 23 is first closed, the current flowing through the winding $a$ of the relay 67 to charge the condenser 68 is sufficient to cause actuation of the front contact of the relay 67 to its picked-up or closed position. After the condenser 68 is fully charged, however, the current through the winding $a$ is so reduced, due to the resistance of the resistor 69, as to be insufficient to maintain the contact of the relay picked-up unless winding $b$ is previously sufficiently energized for such purposes in the manner presently to be described.

If the car is traveling at a speed in excess of a certain speed, such as five miles per hour, so that the voltage impressed on the winding $b$ of the relay 67 exceeds a corresponding value, the contact of the relay 67 will not be restored to its dropped-out position upon the reduction in the degree of energization of the winding $a$ of the relay 67 but will be maintained in its picked-up or closed position as long as the car travels at a speed in excess of said certain speed.

When the car reduces below said certain speed however, the degree of energization of the winding $b$ of the relay 67 is so reduced that the contact of the relay is restored to its dropped-out or open position.

With the contact of the relay 67 in its closed position, a circuit is established for energizing the winding of the relay 66. This circuit extends from the positive battery wire 71 by way of a branch wire 77 and a wire 76, including in series relation therein the contact of the relay 67 and the winding of the relay 66, back to the negative battery wire 72.

The contact of the relay 66 is effective in its picked-up or closed position to establish a circuit for energizing the primary winding 56 of the induction generator 41 on the car and, at the same time, to condition a circuit whereby the winding of the relay 65 may be energized in response to the pick-up of either of the relays 46 of the wheel truck corresponding thereto. These circuits will be described hereinafter in connection with an assumed operation.

The relay 65 corresponding to a particular wheel truck is effective, when picked-up, to establish a circuit for energizing the electromagnet winding 35 of the control valve mechanism 22 for the corresponding truck. This circuit extends from the positive battery wire 71 by way of the branch wire 77 and a wire 81, including in series relation therein the contact of the relay 65 and the electromagnet winding 35 of the control valve mechanism 22, to the negative battery wire 72.

*Operation of equipment*

Let it be assumed that the main reservoir 17 is charged to the normal pressure carried therein, such as one hundred pounds per square inch, by means of a fluid compressor not shown and that the supply pipe 15 is correspondingly charged. Let it be further assumed that the car is traveling along the road under power, with the brake valve handle 19a in its brake release position so that the brakes are released.

If, now, the operator desires to bring the car to a stop, he first shuts off the propulsion power and then shifts the brake valve handle 19a into its application zone an amount corresponding to the desired degree of brake application. The control pipe 16 is thus charged with fluid at a pressure corresponding to the position of the brake valve handle, for example fifty pounds per square inch.

With the electromagnet winding 35 of the control valve mechanism 22 for each wheel truck deenergized as it now is, for reasons hereinafter made apparent, communication is established from the control pipe 16 through each of the control valve mechanisms to the control chamber of the relay valve device 21 for each wheel truck.

Each relay valve device 21 is thus operated in response to the pressure of fluid supplied thereto from the control pipe 16 to supply fluid at a corresponding pressure from the supply pipe 15 to the brake cylinders 14 to thereby effect application of the brakes to a degree corresponding to the pressure of the fluid established in the brake cylinder.

If the degree of brake application and the adhesion of the wheels to the rails is such that during a brake application none of the wheels on the car slip, no further variation of the pressure of the fluid supplied to the brake cylinder occurs except in accordance with variations of the pressure in the control pipe 16 effected by the operator through the medium of the brake valve 19.

If, in customary manner, the operator desires to reduce the degree of the brake application as the car approaches a stop, he may do so by returning the brake valve handle 19a toward its brake release position. The pressure in the control pipe 16 is thereby correspondingly reduced, as is the pressure of the fluid supplied to the control chamber of the relay valve devices 21. Each relay valve device 21 thus operates in response to the reduction of the pressure supplied to the control chamber thereof to exhaust fluid under pressure from the associated brake cylinders 14 to a degree corresponding to the reduction of pressure in the control pipe.

When the car comes to a complete stop, the operator may release the brakes, prior to again starting the car, by merely restoring the brake valve handle 19a to its brake release position, thereby reducing the pressure in the control pipe 16 and correspondingly in the control chamber of the relay valve devices 21 to atmospheric pressure. The relay valve devices 21 thus operate to effect the exhaust of fluid under pressure from the brake cylinders to effect the complete release of the brakes.

When a brake application is initiated, and the pressure in the control pipe 16 exceeds a pressure of five pounds per square inch, the pressure switch 23 is actuated to its closed position thereby impressing the voltage of the battery 73 across the battery wires 71 and 72. The contact of the relay 67 is thus picked-up in response to the momentary current flowing through the winding a of the relay 67 to charge the condenser 68 as previously described, and assuming that the car is traveling at a speed in excess of a certain speed, such as five miles per hour, the winding b of relay 67 is therefore energized sufficiently to maintain the contact of the relay picked-up thereafter.

Energization of the winding b of relay 67 is of course contingent upon the generation of an alternating-current voltage in the secondary winding 57 of the induction generator 41 of the corresponding wheel-slip detecting apparatus. Such voltage is not established, however, unless the primary winding 56 is energized. The primary winding 56 of each of the induction generators is not energized unless the contact of the relay 66 is actuated to its picked-up or closed position.

It will thus be seen that when the contact of the relay 67 is first picked-up in response to the energization of the winding a of the relay 67, such energizing current through the winding a must continue long enough to permit the corresponding induction generator to supply the necessary voltage to energize the winding b of the relay 67 sufficiently to maintain the relay 67 picked-up thereafter as long as the speed of the car exceeds a speed, such as five miles per hour.

The circuit for energizing the primary winding 56 of the respective induction generators 41 on a car extends from the positive terminal of the storage battery 73 by way of the wire 74 including closed pressure switch 23 and a choke coil 85 provided for the purpose of dampening the effect of the self-induced voltage in the primary windings 56, in parallel through all of the primary windings 56 of the several induction generators 41 on the car to a bus wire 86, and thence by way of a branch wire 87 including the closed contact of the relay 66, and wire 78 to the negative battery wire 72.

When the speed of the car reduces below five miles per hour, the contact of the relay 67 is restored to its dropped-out or open position, thus effecting deenergization of the winding of the relay 66. The contact of the relay 66 is thus, in turn, restored to its dropped-out or open position interrupting the circuit for energizing the primary winding 56 of each of the induction generators on the car.

When the circuit for energizing the primary winding 56 of the induction generators 41 is interrupted, a momentary half-cycle of voltage is induced in the secondary winding 57 of the induction generators. Since such momentary voltage increases and decreases at a very rapid rate, the relays 46 may be picked-up momentarily in response to the decreasing voltage. However, due to the fact that the circuit for energizing the windings of the several relays 65 is open at the contact of the relay 66, the fact that the relays 46 for each wheel truck may pick-up momentarily is without effect. As will presently appear, undesired release of the brakes will therefore not occur.

It will thus be apparent that when the car comes to a complete stop and notwithstanding that the brakes remain applied to a degree corresponding to the position of the brake valve handle 19a, the circuit for energizing the primary windings 56 of the induction generators 41 on the car is automatically interrupted due to the drop-out of the relay 67 in the manner previously described.

In the foregoing description of a brake application, it was assumed that none of the wheels 12 of the wheel-and-axle assemblies slipped. In the event that the wheels of one or both of the wheel-and-axle assemblies begin to slip during a brake application, a further operation occurs which will now be described.

Let it be assumed that when the brakes are applied initially or at any time during a brake application, the wheels of the right-hand wheel-and-axle assembly in Fig. 1 begin to slip. The relay 46 of the wheel-slip detector corresponding to the slipping wheels is thus picked-up in response to the rotative deceleration of the wheels at a rate exceeding ten miles per hour per second, which as previously explained, is not attained unless the wheels slip.

The contact of the relay 46 is effective in its picked-up or closed position to establish a circuit for energizing the winding of the relay 65 for the corresponding wheel truck. This circuit extends from the positive terminal of the battery 73 by way of the wire 74 including the closed contacts 38 and 39 of the pressure switch 23, positive battery wire 71, a wire 95 including the contact of the relay 46, a wire 96 including the winding of the relay 65 to the wire 87, and thence by way of the wire 87 including the closed contact of the relay 66, wire 78 and negative battery wire 72 to the negative terminal of the battery 73.

The single front contact of the relay 65 is thus actuated to its picked-up or closed position in response to the energization of the winding of the relay in the manner just described, and is effective in its closed position to establish a circuit for energizing the electromagnet winding 35 of the control valve mechanism 22 for the corresponding truck. As previously indicated, the circuit for energizing the electromagnet winding 35 extends from the positive battery wire 71 by way of the branch wire 77 and wire 81 including in series relation therein the front contact of the relay 65 and the electromagnet winding 35 to the negative battery wire 72. In view of the fact that the pressure switch 23 is closed, the battery voltage is impressed across the battery wires 71 and 72 and thus the electromagnet winding 35 is energized upon the pick-up of the relay 65.

Upon the energization of the electromagnet winding 35 of the control valve mechanism 22, the communication between the control pipe 16 and pipe 31 leading to the control chamber of the relay valve 21 is closed and, substantially simultaneously therewith, communication is established whereby fluid under pressure is exhausted at a rapid rate from the pipe 31 and control chamber of the relay valve 21 to atmosphere. The relay valve 21 accordingly operates instantly and rapidly to exhaust fluid under pressure from the brake cylinders 14 in correspondence with the reduction of the pressure in the control chamber of the relay valve.

At the same time, the reapplication control valve device of the control valve mechanism 22 is conditioned automatically in response to the reduction of pressure in the control chamber of the relay valve 21 so that upon subsequent reapplication or resupply of fluid under pressure to the control chamber of the relay valve 21, the rate of supply is restricted to a relatively slow rate. This operation is explained in detail in the above-mentioned copending application Serial No. 381,083 of Joseph C. McCune.

Due to the instantaneous and rapid reduction of the pressure of the fluid in the brake cylinders 14 when the wheels began to slip, the wheels promptly cease to decelerate and then begin to accelerate back toward a speed corresponding to vehicle speed without actually decelerating to a locked condition and sliding.

As previously indicated, the relay 46 is picked-up only in response to a rate of rotative deceleration of the car wheel corresponding to a rate of retardation of the car of ten miles per hour per second. However, due to the fact that less current is required to maintain the contact of the relay 46 picked-up, once it is picked-up, the relay contact is not restored to its dropped-out or open position until the wheels cease to decelerate at a rate exceeding a lower rate, such as six or seven miles per hour per second.

When the contact of the relay 46 is restored to its dropped-out or open position, the circuit previously traced, for energizing the winding of the relay 65 is thereby interrupted and the contact of the relay 65 thereby instantly restored to its open position. The restoration of the contact of the relay 65 to its dropped-out or open position instantly interrupts the circuit for energizing the electromagnet winding 35 of the control valve mechanism 22.

Upon the deenergization of the electromagnet winding 35 of the control valve mechanism 22, further exhaust of fluid under pressure from the control chamber of the relay valve 21 through the pipe 31 is instantly cut-off and communication is restored through which fluid under pressure is again supplied from the control pipe 16 to the control chamber of the relay valve 21. As previously indicated, however, the resupply of fluid under pressure to the control chamber of the relay valve 21 is now at a relatively restricted or slow rate. Thus the relay valve 21 operates in response to the restricted rate of build-up of pressure in its control chamber to correspondingly resupply fluid under pressure to the brake cylinders 14 at a restricted or slow rate.

The resupply of fluid under pressure from control pipe 16 to the control chamber of relay valve 21 tends to reduce the pressure in the control pipe but due to the pressure-maintaining feature of the brake valve 19 the pressure corresponding to the position of the brake valve handle 19a is maintained in the control pipe.

Due to the restricted rate of resupply of fluid pressure to the brake cylinders 14, the degree of brake application on the wheels of the truck having the slipping wheels is restored gradually back toward the degree in effect at the time slipping of the wheels began. Thus, if the slipping of the wheels was caused by a momentary bad rail condition, that is a condition of low adhesion, the slipping of the wheels will not be likely to again occur due to the reapplication being effected at a restricted or slow rate. After a predetermined time, determined by the design of the reapplication control device of the control valve mechanism 22, the pressure corresponding to the pressure in the control pipe 16 is fully restored in the brake cylinders 14.

If the wheels of the right-hand wheel-and-axle assembly again begin to slip upon the reapplication of the brakes in a manner just described, the apparatus again functions as previously described to effect the instantaneous and rapid reduction of the pressure in the brake cylinders 14 for the truck having the slipping wheels and thereafter causes the resupply of fluid under pressure to the brake cylinders at a restricted or slow rate.

Thus repeated cycles of automatic release and automatic reapplication of the brakes associated with the wheels of the given truck may occur during a brake application, but at no time are the wheels permitted to decelerate to a locked condition and slide.

It will be apparent that if the wheels of the left-hand wheel-and-axle assembly of Fig. 1 bebin to slip during a brake application, automatic release and reapplication of the brakes on the same truck will occur. The operation will, however, be initiated in response to the pick-up of the relay 46 of the wheel-slip detecting apparatus corresponding to the slipping wheels. Since the contacts of the relays 46 for a given wheel truck are connected in parallel relation, no further description of the circuits for this operation is deemed necessary.

While I have shown only a single wheel truck and the control apparatus therefor, it will be understood that the wheel truck at the opposite end of the car will be provided with wheel-slip detecting apparatus similar to that shown in Fig. 1. In other words, slipping of the wheels of a wheel truck (not shown) at the opposite end of the car will cause pick-up of a relay corresponding to the relay 65, which relay is in turn connected to control the electromagnet winding 35 of a control valve mechanism for that truck corresponding to the valve mechanism 22, which valve mechanism in turn controls a relay valve corresponding to the relay valve 21. Thus it will be seen that slipping of the wheels on a given wheel truck initiates the automatic release and reapplication of the brakes only on the wheel truck having the slipping wheels.

It will be understood that each car is provided with but a single relay 66 and a single relay 67 for controlling the energizing circuit of the primary windings 56 of the respective wheel-slip detectors 41 on the car. It will be seen that the bus wires 74 and 86 extend throughout the length of the car and thus energization of the primary windings 56 of the wheel slip detectors throughout the car are under the control of the pressure switch 23 and the relay 66.

In a similar manner, the circuit for energizing the relay (not shown) corresponding to the relay 65 for the wheel truck at the opposite end of the car extends from the positive battery wire 71 to a wire 96a and thence by way of the wire 87 including the contact of the relay 66, wire 78 and negative battery wire 72 to the negative terminal of the battery 73. Thus, whenever the speed of the car reduces below five miles per hour, the drop-out of the relay 67 and the consequent drop-out of the relay 66 interrupts the circuit for energizing the primary winding 56 of all wheel-slip detectors on a given car. At the same time, the drop-out of the contact of the relay 66 prevents the undesired pick-up of the relay 65 for either of the wheel trucks in response to the momentary pick-up of any of the relays 46 of the corresponding truck in response to the interruption of the circuit for energizing the primary windings 56, as previously described.

It will be observed that the direction of travel of the car is immaterial, as far as the operation of the wheel-slip detecting apparatus is concerned, for the reason that the alternating-current voltage supplied to the input terminals of the full-wave rectifiers 44 is rectified and impressed on the resistor 47 of each wheel-slip detecting apparatus as direct-current voltage. Moreover, since the polarity of the voltage impressed on the winding $b$ of the relay 67 is always the same the operation of the relays 66 and 67 is not affected by a change in the direction of travel of the car.

*Summary*

Summarizing, it will be seen that I have disclosed vehicle brake control apparatus, particularly for a railway car, including wheel-slip detecting apparatus of the induction generator type for automatically releasing and then reapplying the brakes on a given wheel truck whenever any of the wheels of the truck begin to slip, thereby preventing the sliding of the wheels.

According to my invention, I have provided apparatus of relatively simple character for automatically interrupting the energizing circuit for the primary winding of the induction generators in the above apparatus whenever a car or train comes to a stop so as to prevent the undesired consumption of energy from a source, such as storage battery. This apparatus is, at the same time, effective to prevent the undesired release of the brakes which would otherwise occur in response to the interruption of the energizing circuit for the primary windings of the induction generators.

While I have shown and described my invention in connection with a single wheel truck, the manner in which it may be adapted to the brake equipment for an entire car or train will be obvious to those skilled in the art.

Having now described my invention, what I claim as new and desire to secure by Letters Patent, is:

1. In a vehicle brake control apparatus including wheel-slip detecting apparatus of the induction generator type having a primary winding adapted to be energized by direct-current and a secondary winding in which an alternating current voltage is produced upon rotation of the wheel, the combination of means under the control of the operator of the vehicle for effecting energization and deenergization of the primary winding, and means automatically effective when the vehicle reduces below a certain speed for effecting deenergization of the primary winding notwithstanding the fact that the operator controlled means is not operated to do so.

2. In a vehicle brake control apparatus including wheel-slip detecting apparatus of the induction generator type having a primary winding adapted to be energized by direct-current and a secondary winding in which an alternating current voltage is produced upon rotation of the wheel, the combination of means operatively responsive to the application and the release of the vehicle brakes for effecting energization and deenergization respectively of the primary winding, and means automatically effective to cause deenergization of the primary winding whenever the vehicle reduces below a certain speed notwithstanding the continued application of the brakes.

3. In a vehicle brake control apparatus including wheel-slip detecting apparatus of the induction generator type having a primary winding adapted to be energized by direct-current and a secondary winding in which an alternating-current voltage is induced upon rotation of a vehicle wheel, and means controlled according to the rate of change of the effective voltage supplied from the secondary winding for effecting the release of the brakes associated with the wheel when the wheel slips, the combination of means for effecting energization of the primary winding, and means automatically effective when the vehicle reduces below a certain speed to cause deenergization of the primary winding and adapted to prevent the undesired operation of the brake control means to effect the release of the brakes when the deenergization of the primary winding is effected.

4. In a vehicle brake control apparatus including wheel-slip detecting apparatus of the induction generator type having a primary winding adapted to be energized by direct-current and a secondary winding in which an alternating-current voltage is induced upon rotation of a vehicle wheel, and means controlled according to the rate of change of the effective voltage supplied from the secondary winding for effecting the release of the brakes associated with the wheel when the wheel slips, the combination of means under the control of the operator of the vehicle for effecting energization and deenergization of the primary winding, and means automatically effective when the vehicle reduces below a certain speed for effecting deenergization of the primary winding notwithstanding that the said operator controlled means is not operated to do so and adapted to prevent the undesired operation of the brake control means to effect the release of the brakes when deenergization of the primary winding is effected in response thereto.

5. In a vehicle brake control apparatus including wheel-slip detecting apparatus of the induction generator type having a primary winding adapted to be energized by direct-current and a secondary winding in which an alternating-current voltage is induced upon rotation of a vehicle wheel, and means controlled according to the rate of change of the effective voltage supplied from the secondary winding for effecting the release of the brakes associated with the wheel when the wheel slips, the combination of means operatively responsive to the application and release of the vehicle brakes for effecting energization and deenergization respectively of the primary winding, and means automatically effective to cause deenergization of the primary winding when the vehicle reduces below a certain speed notwithstanding the continued application of the brakes, the last said means being effective to prevent the undesired operation of the brake control means to effect release of the brakes when deenergization of the primary winding is effected in response to the operation of the last said means.

6. In a vehicle brake control apparatus including wheel-slip detecting apparatus of the induction generator type having a primary winding adapted to be energized by direct-current and a secondary winding in which an alternating-current voltage is induced upon rotation of a vehicle wheel, and means controlled according to the rate of change of voltage supplied by the secondary winding for effecting a release of the brakes, the combination of means for effecting energization of the primary winding, means effective to cause deenergization of the primary winding when the vehicle reduces below a certain speed, and means effective to prevent the operation of the brake control means to effect a release of the brakes in response to the deenergization of the primary winding effected by the last said means.

7. In a vehicle brake control apparatus including a wheel-slip detector of the induction generator type having a primary winding adapted to be energized by direct-current of a certain substantially constant value, means rotatable according to the rotation of a wheel of the vehicle for producing successive alternate increases and decreases in the density of the magnetic flux set up by said primary winding, and a secondary winding in which an alternating-current voltage is induced upon successive alternate increases and decreases in the density of magnetic flux produced by the primary winding, the combination of a relay effective upon energization to establish a circuit for energizing the primary winding, means effective to cause energization of said relay for a certain limited time, and means controlled according to the voltage delivered by the secondary winding for thereafter maintaining said relay energized, notwithstanding the expiration of the certain limited time, as long as the effective voltage delivered from the secondary winding exceeds a certain value.

8. In a vehicle brake control apparatus including a wheel-slip detector of the induction generator type having a primary winding adapted to be energized by direct-current of a certain substantially constant value, means rotatable according to the rotation of a wheel of the vehicle for producing successive alternate increases and decreases in the density of the magnetic flux set up by said primary winding, and a secondary winding in which an alternating-current voltage is induced upon successive alternate increases and decreases in the density of magnetic flux produced by the primary winding, the combination of a relay effective upon energization to establish a circuit for energizing the primary winding, a second relay having a first winding and a second winding, the first winding being effective when energized above a certain degree to cause pick-up of the relay and the second winding being effective when energized above a second certain degree for maintaining the relay picked-up, said second relay being effective while picked-up to cause energization of the first said relay, means for effecting energization of the first winding of said second relay for a certain limited time, and means for energizing the second winding of said second relay in accordance with the effective voltage induced in the secondary winding of the generator to thereby cause the first said relay to remain picked-up for a time longer than said certain limited time as long as the current energizing the second winding of said second relay exceeds the corresponding certain degree in accordance with the voltage induced in the secondary winding of the generator.

9. In a vehicle brake control apparatus including wheel-slip detecting apparatus of the induction generator type having a primary winding adapted to be energized by direct-current to set up a magnetic flux, a secondary winding in which an alternating-current voltage is induced in response to successive alternate increases and decreases in the density of the magnetic flux set up by the primary winding, and means rotatable according to the rotational speed of a vehicle wheel for alternately increasing and decreasing the density of the magnetic flux set up by the primary winding at a frequency proportional to the rotational speed of the wheel, the combination of a relay effective when energized to cause energization of the primary winding of the generator, means for effecting energization of said relay for a certain limited time, and means controlled according to the voltage induced in the secondary winding of the generator for maintaining the said relay energized for a time longer than said certain limited time and as long as the vehicle wheel with which the generator is associated rotates in excess of a certain speed.

10. In a vehicle brake control apparatus including wheel-slip detecting apparatus of the induction generator type having a primary winding adapted to be energized by direct-current to set up a magnetic flux, a secondary winding in which an alternating-current voltage is induced in response to successive alternate increases and decreases in the density of the magnetic flux set up by the primary winding, and means rotatable according to the rotational speed of a vehicle wheel for alternately increasing and decreasing the density of the magnetic flux set up by the primary winding at a frequency proportional to the rotational speed of the wheel, the combination of a relay effective when energized to cause energization of the primary winding of the generator, a second relay having a first winding and a second winding, the first winding being effective when energized by a current exceeding a certain value to cause pick-up of the relay and the second winding being effective when energized in accordance with a voltage exceeding a certain value to maintain said relay picked-up, said second relay being effective when picked-up to cause energization of the first said relay, means for energizing the first winding of said second relay for a certain limited time, and means for energizing the second winding of said second relay in accordance with the effective voltage induced in the secondary winding of the generator to thereby maintain the first said relay energized as long as the wheel with which the generator is associated rotates in excess of a certain speed.

11. In a vehicle brake control apparatus including wheel-slip detecting apparatus of the induction generator type having a primary winding adapted to be energized by direct-current to set up a magnetic flux, a secondary winding in which an alternating-current voltage is induced in response to successive alternate increases and decreases in the density of the magnetic flux set up by the primary winding, and means rotatable according to the rotational speed of a vehicle wheel for alternately increasing and decreasing the density of the magnetic flux set up by the primary winding at a frequency proportional to the rotational speed of the wheel, the combination of a relay effective when energized to cause energization of the primary winding of the generator, a second relay having a first winding and a second winding, the first winding being effective when energized by a current exceeding a certain value to cause pick-up of the relay and the second winding being effective when energized in accordance with a voltage exceeding a certain value to maintain said relay picked-up, said second relay being effective when picked-up to cause energization of the first said relay, means providing a source of direct-current voltage, a circuit including the first winding of said second relay, a condenser in said circuit, a resistor connected in parallel relation to said condenser, means for impressing the voltage from said source on said circuit whereby the current supplied to charge said condenser exceeds the certain value for the first winding of the second relay for a certain limited time until the condenser is charged to the voltage of said source, said resistor being thereafter effective to limit the current supplied to said circuit to energize the first winding of said second relay to a value less than the certain value therefor, and means for impressing a direct-current voltage on the second winding of said second relay varying according to variations in the effective voltage induced in the secondary winding of said generator to thereby cause the first said relay to remain energized after the expiration of said certain limited time only so long as the wheel with which the generator is associated rotates in excess of a certain speed.

12. In a vehicle brake control apparatus including wheel-slip detecting apparatus of the induction generator type having a primary winding adapted to be energized by a direct-current, a secondary winding, means for causing an alternating-current voltage to be induced in said secondary winding varying in effective value according to the rotational speed of a vehicle wheel, and brake control means controlled according to the variations of the voltage induced in the secondary winding at a rate exceeding a certain rate for effecting the release of the brakes associated with the vehicle wheel, the combination of a switch device operatively responsive to the application and the release of the brakes associated with the vehicle wheel, a relay, means set in operation by the operation of said switch device in response to initiation of a brake application for effecting energization and consequent pick-up of said relay for a certain limited time, said switch device and said relay being jointly effective to establish a circuit for energizing the primary winding of the generator while the brakes are applied and while the said relay is energized, and means effective as long as the voltage induced in the secondary winding of the generator exceeds a certain value corresponding to a certain rotational speed of the associated wheel for maintaining the said relay energized, once energization has been effected, notwithstanding the expiration of said certain limited time.

13. In a vehicle brake control apparatus including wheel-slip detecting apparatus of the induction generator type having a primary winding adapted to be energized by a direct-current, a secondary winding, means for causing an alternating-current voltage to be induced in said secondary winding varying in effective value according to the rotational speed of a vehicle wheel, and brake control means controlled according to variations of the voltage induced in the secondary winding at a rate exceeding a certain rate for effecting the release of the brakes associated with the vehicle wheel, the combination of a source of direct-current potential, a relay having a first winding and a second winding, the first winding being effective to cause pick-up of the relay when energized by a current exceeding a certain value and the second winding being effective when energized by a current exceeding a second certain value for maintaining the relay picked-up, a circuit including the first winding of said relay, a condenser in said circuit, a resistor connected in parallel relation to said condenser, a switch device having a normally-open position when the brakes are released and operative to a closed position when the brakes are applied to cause the voltage of said direct-current source to be impressed on said circuit to thereby cause a current to flow therein to charge said condenser and correspondingly energize the first winding of the relay by a current exceeding said certain value for a certain limited time until the condenser is charged to the voltage of said source, said resistor being thereafter effective to reduce the current energizing the first winding of said relay to below said certain value, a second relay adapted to be energized as long as the first said relay is picked-up, said switch device and said second relay being effective jointly to establish a circuit for energizing the primary winding of the generator as long as the brakes are applied and the winding of said second relay remains energized, and means for impressing a voltage corresponding to the voltage induced in the secondary winding of the generator on the second winding of the first said relay to thereby maintain it energized by a current exceeding the said second certain value, notwithstanding the expiration of said certain limited time, as long as the wheel with which the generator is associated rotates in excess of a certain speed.

14. In a vehicle brake control apparatus including wheel-slip detecting apparatus of the induction generator type having a primary winding adapted to be energized by a direct-current, a secondary winding, means for causing an alternating-current voltage to be induced in said secondary winding varying in effective value according to the rotational speed of a vehicle wheel, and brake control means controlled according to variations of the voltage induced in the secondary winding at a rate exceeding a certain rate for effecting the release of the brakes associated with the vehicle wheel, the combination of a source of direct-current potential, a relay having a first winding and a second winding, the first winding being effective to cause pick-up of the relay when energized by a current exceeding a certain value and the second winding being effective when energized by a current exceeding a second certain value for maintaining the relay picked-up, a circuit including the first winding of said relay, a condenser in said circuit, a resistor connected in parallel relation to said condenser, a switch device having a normally-open position when the brakes are released and operative to a closed position when the brakes are applied to cause the voltage of said direct-current source to be impressed on said circuit to thereby cause a current to flow therein to charge said condenser and correspondingly energize the first winding of the relay by a current exceeding said certain value for a certain limited time until the condenser is charged to the voltage of said source, said resistor being thereafter effective to reduce the current energizing the first winding of said relay to below said certain value, a second relay adapted to be energized as long as the first said relay is picked-up, said switch device and said second relay being effective jointly to establish a circuit for energizing the primary winding of the generator as long as the brakes are applied and the winding of said second relay remains energized, and means for impressing a voltage corresponding to the voltage induced in the secondary winding of the generator on the second winding of the first said relay to thereby maintain it energized by a current exceeding the said second certain value, notwithstanding the expiration of said certain limited time, as long as the wheel with which the generator is associated rotates in excess of a certain speed, said second relay being effective when deenergized to prevent the operation of the brake control means to release the brakes in response to the interruption of the circuit for energizing the primary winding of the generator.

15. In a vehicle brake control apparatus including wheel-slip detecting apparatus of the induction generator type having a primary winding adapted to be energized by a direct-current and a secondary-winding inductively related to the primary winding in which an alternating current voltage is induced varying in effective value according to the rotational speed of an associated wheel of the vehicle, and brake control means operative in response to variation in the effective value of the voltage induced in the secondary winding at a rate exceeding a certain rate for effecting the release of the brakes associated with the vehicle wheel, the combination of means for effecting energization of the primary winding, means automatically effective when the vehicle reduces below a certain speed for effecting a reduction in the degree of energization of the primary winding, and means for preventing the undesired operation of the brake control means to effect the release of the brakes in response to the operation of the last said means to reduce the degree of energization of the primary winding.

CLAUDE M. HINES.